United States Patent
Rivaton

[11] Patent Number: 5,975,171
[45] Date of Patent: Nov. 2, 1999

[54] DEVICE FOR SUPPORTING A TREAD

[75] Inventor: Renaud Rivaton, Blanzat, France

[73] Assignee: Compagnie Generale des Etablissements Michelin - Michelin & Cie, Clermont-Ferrand Cedex, France

[21] Appl. No.: 08/935,095

[22] Filed: Sep. 25, 1997

[30] Foreign Application Priority Data

Oct. 8, 1996 [FR] France .................................. 96 12346

[51] Int. Cl.⁶ .................................................. B60C 17/04
[52] U.S. Cl. ........................................... 152/158; 152/520
[58] Field of Search ................................. 152/158, 520, 152/521

[56] References Cited

U.S. PATENT DOCUMENTS

| | | | |
|---|---|---|---|
| 4,173,243 | 11/1979 | Wilde et al. | 152/158 |
| 4,183,388 | 1/1980 | Cassidy | 152/158 |
| 4,327,791 | 5/1982 | Strader | 152/158 |
| 4,694,873 | 9/1987 | Gerloff et al. | 152/380 |
| 5,194,104 | 3/1993 | Wada et al. | 152/520 |
| 5,450,887 | 9/1995 | Habay et al. | 152/520 |
| 5,837,073 | 11/1998 | Cauquot et al. | 152/158 |

Primary Examiner—Francis J. Lorin
Attorney, Agent, or Firm—Baker & Botts, L.L.P.

[57] ABSTRACT

A device for supporting the tread of a tire which includes a rigid support (1) and an elastic top cap rubber (2) made of a vulcanized rubber compound, a lubricant (5) arranged between said support (1) and said top cap rubber (2) allowing circumferential displacement between the support (1) and the top cap rubber (2), wherein each shoulder (122) of the bearing ring (12) of the support (1) is equipped on its edge with at least one straight circumferential groove (124) in which there is housed the corresponding circumferential rib (25) of the radially internal face (200) of the top cap rubber (2), said rib (25) being in contact with the bottom of the groove (124) of the support (1).

5 Claims, 3 Drawing Sheets

DEVICE FOR SUPPORTING A TREAD

BACKGROUND OF THE INVENTION

The invention relates to a device for supporting the tread of a tire, said device being used when the tire needs to run at a zero or low inflation pressure. The use of such a device, also known as a safety device and mounted inside the tire, needs to allow the equipped and loaded vehicle to continue to run despite the partial or complete loss of inflation pressure, this continued running being beneficial for various known reasons.

European Patent Application EP 0 635 384 A has proposed a safety device formed of two materials and comprising at least a rigid support and an elastic top cap rubber made of a vulcanized rubber compound, said top cap rubber surrounding the rigid support. Between said support and said top cap rubber there is a lubricant allowing circumferential displacement of the top cap rubber on the support, while the radially external shape of the bearing ring of the support interacts with the reinforcing elements which there are in the top cap rubber in order radially to hold and circumferentially to guide (transverse holding) the top cap rubber on the support. The reinforcing elements are composed of at least one wire supplemented by reinforcing belt comprising at least one ply passing radially beneath said wire.

As effective safety devices are often used on vehicles that have a "centralized" inflation system, that is to say, a system allowing the tire to be inflated and deflated during running, the use of a lubricant that is solid or pasty but which disperses under the effects of friction and of heat causes malfunctioning of the inflation system.

SUMMARY OF THE INVENTION

The invention aims to improve the above device and avoid as far as possible any diffusion of the lubricant. For that, the invention proposes to modify the meridian profiles of the radially upper face of the bearing ring of the support and of the radially internal face of the top cap rubber, respectively, in the ring rim region.

The device for supporting the tread of a tire in accordance with the invention and comprising at least a rigid support and an elastic top cap rubber made of a vulcanized rubber compound, a lubricant arranged between said support and said top cap rubber allowing circumferential displacement between the support and the top cap rubber, while the radially external shape of the bearing ring of the support, this ring having two ring shoulders, interacts with the reinforcing elements which there are in the top cap rubber in order radially to hold and circumferentially to guide said top cap rubber on the support, is one wherein each shoulder of the ring is equipped on its edge with at least one straight circumferential groove in which there is housed a circumferential rib arranged on the radially internal face of that part of the rubber top cap rubber that corresponds to the shoulder of the bearing ring of the support, said rib being in contact with at least the bottom of the corresponding groove in the shoulder without said rib being compressed onto the bottom of said groove.

While in the axial width it is common to the radially external face of the metal bearing ring and to the radially internal face of the rubber top cap rubber there is a space of a small radial size intended to give the lubricant the maximum effectiveness, each rib of the top cap rubber being in contact with the bottom of the corresponding groove of the shoulder, the lubricant is locked in during normal running while at the same time allowing the top cap rubber to rotate about the support during running in degraded mode (low pressure or zero pressure), there being enough lubrication at the grooves and the rib not being trapped in the groove in any way.

In the case of a device in which, on the one hand, the bearing ring of the support comprises a mid portion or central part and, axially on each side, two ring shoulders, the radially external face of said mid portions between the shoulders being further from the axis of rotation of the device than the radially external faces of the shoulders, and in which, on the other hand, the elastic top cap rubber comprises radially on the inside and in each of its edges, a reinforcing wire arranged axially facing the external face of the ring, each rib on the radially internal face of the top cap rubber is advantageously situated axially further out than the projection onto said face of the maximum axial width of the reinforcing wire.

The effectiveness of the above system is greatly improved if the space between the top cap rubber and the bearing ring is as constant as possible across the axial width, except for the width that corresponds to the grooves and ribs, irrespective of the running conditions, that is to say at rest, during normal running, and during running in degraded mode. In order to conserve the meridian profile of the radially internal face of the top cap rubber, it is advantageous for the reinforcing belt or, which is folded around the two wires situated in the lateral edges, to be formed of cords preferably made of aromatic polyamide, and to be surmounted, in its central part, by a ply of cords which are mutually parallel and are at an angle of at most 10° and preferably of or very close to 0° (that is to say 0°±2.5°) with respect to the circumferential direction, said cords also being made of aromatic polyamide or of metal. This alternative form makes it possible better to conserve the meridian profile between the end of vulcanization of the top cap rubber and its putting in place on the support, while at the same time better spreading the loads which are due to centrifugal force during running, by tightly binding the central part of said top cap rubber.

It is likewise advantageous, in order to counter the effects of said centrifugal force, to have the most uniform possible axial distribution of mass. A top cap rubber which does not have grooves on its radially external face, and the use of lighter wires, either as a result of the density of the materials of which they are composed or by reducing their cross-sectional area, make it possible to increase the mass at the center of the top cap rubber and reduce it at the edges.

A reduction in mass on the lateral edges of the top cap rubber may also advantageously be achieved by adopting a suitable lateral meridian profile, the distinguishing feature of said profile being that it comprises, viewed in transverse section, a concave recess on each side between two convex bulges.

In the case of a device in which the bearing ring of the support has at its center a well that corresponds to a central and circumferential rib of the top cap rubber, this rib being reinforced by a single wire, the distribution of mass will be optimized by the presence on the radially external face of the top cap rubber of at least one central groove, it likewise being possible for the lateral meridian profile to comprise a concave recess thus making it possible to make the elastic top cap rubber more flexible and easier to fit.

The invention will be better understood from the description which follows with reference to the accompanying drawings which illustrate non-limiting embodiments of the invention.

DESCRIPTION OF PREFERRED EMBODIMENTS

Figure 1:
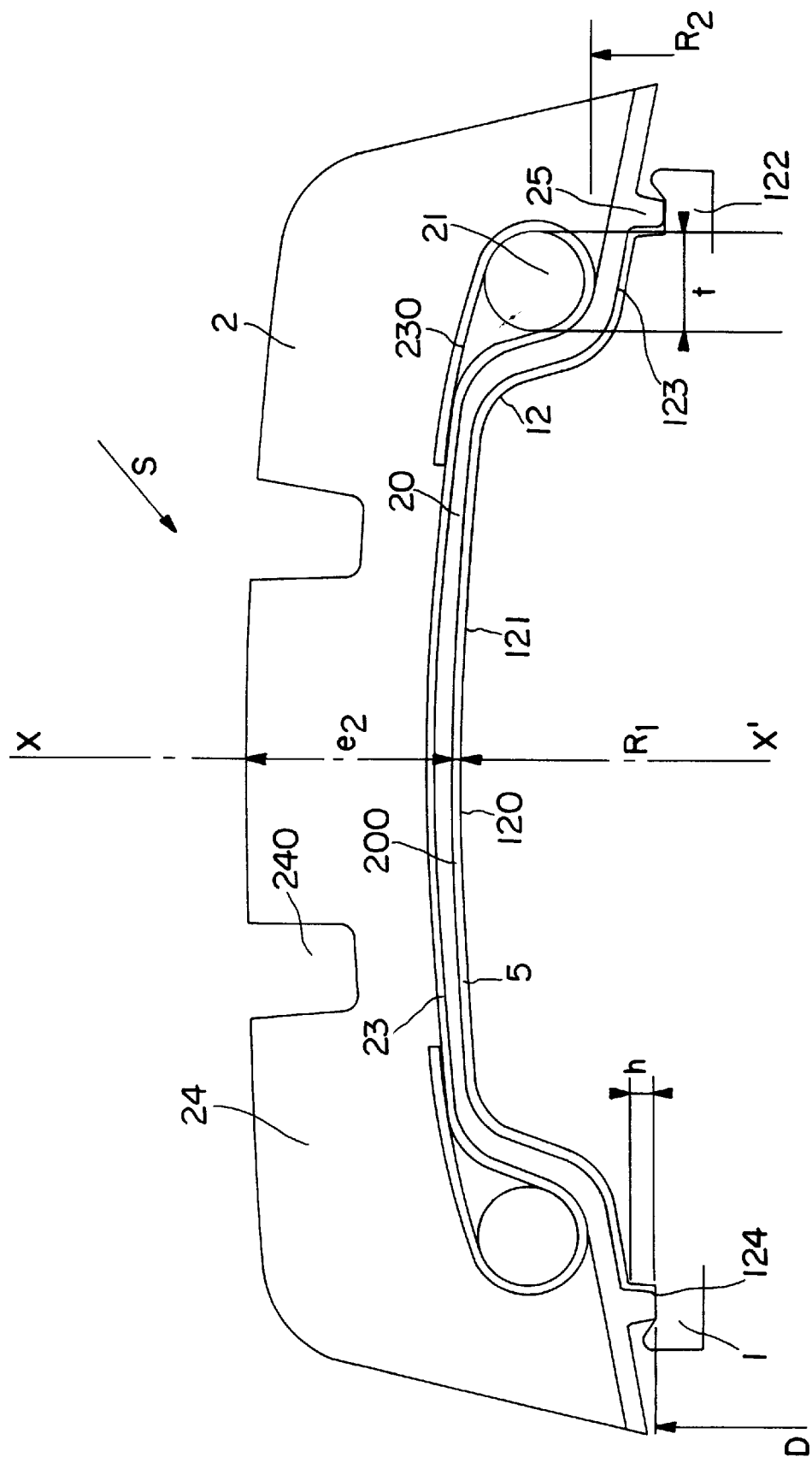
FIG. 1 diagrammatically depicts, viewed in meridian section, a device according to the invention, FIG. 2 diagrammatically depicts, viewed in meridian section, an alternative form of the device as shown in FIG. 1, with various improvements, FIG. 3 diagrammatically depicts, viewed in meridian section, an alternative form of the device in accordance with the invention, in which device the bearing ring of the support includes a well.

Safety device S shown in FIG. 1 and intended to be fitted inside a tire, for example, of the 14.00–20× size, is composed of three parts: a rigid metal support 1, a non-rigid elastic top cap rubber 2 intended to come into contact with the interior face of the crown of the tire, and an annular component (not shown) for connecting to a conventional dismantlable wheel rim, that is to say a wheel rim formed of at least three parts.

The rigid support 1 is a support made of aluminum alloy. Viewed in meridian section it is formed of a base (not shown) radially surmounted by a disk (not shown) itself surmounted by a bearing ring 12 which is intended to have, on its radially external face, a layer of lubricant 5 for the top cap rubber 2. This bearing ring 12 has a transverse shape similar to the shape of a wheel rim, but inside out, that is to say with the outer surface of the central part or mid portion 120 of the ring further from the axis of rotation of the device than the tops of the shoulders 122 of the ring. The outer surface of the central part 120 of the ring has a slightly convex radially external face 121, that is to say a face whose center of curvature is situated on the line XX' of the equatorial plane of the device and radially toward the inside. As to the shoulders 122, they are each provided with a straight, circumferential groove 124, said groove having a depth h equal to 0.15 times $e_2$, but which may be between 0.10 and 0.25 times said thickness $e_2$ of the top cap rubber 2 while its width, measured at the top of the groove is equal to h but may be between 0.4 h and 1.4 h. The groove 124 has two walls which are laterally connected on the one hand to the radially external face 123 of the shoulder 122 of the bearing ring 12 and connected on the other hand to the flat or circular bottom of groove by two circular surfaces. Those parts of the radially external faces 123 of the shoulders 122 which are closest to the outer surface of the center 120 of the ring are practically straight and parallel to the axis of rotation. The distance, separating the furthest point from the axis of rotation of the radially external face 121 of the ring from the straight line joining point of the faces 123 the nearest the face 121, is equal to 22 mm and in general at least equal to 0.25 times the thickness $e_2$ of the top cap rubber 2.

Radially on the outside of the rigid support 1, on the external face of the bearing ring 12 covered with a layer of pasty lubricant 5, is the non-rigid and elastic top cap rubber 2.

Said top cap rubber 2 is in the form of a closed circular annulus and has a radially internal face 200 which in its central part geometrically matches the meridian profile of the radially external face 121 of the bearing ring 12, at every point being distant from the face 121 by a value equal to 1 mm so as to make the lubricant 5 as effective as possible. Said face 200 is provided on each of its lateral edges with a circumferential rib 25 facing the groove 124 of the bearing ring 12. Dimensionally, the diameter D of its generatrix radially closest to the axis of rotation is the same as the diameter D of the generatrix of the groove 124 closest to the axis of rotation, which means that there is no pressing of the rib in the groove and that there is no compression of the rubber that forms the rib. The axial width of the rib is less than the axial width h of the groove in the support, and the rib is situated further out, in the axial direction, than the projection t of the diameter of the braided wire 2 onto the face 200 of the top cap rubber.

The top cap rubber 2 comprises, radially on the inside, a layer 20 of vulcanized compound which has a low coefficient of friction with aluminum while at the same time having great mechanical strength so that it can withstand the imperfections in the surface finish of the support 1 and withstand the effect of any foreign bodies that might become inserted between said support 1 and the top cap rubber 2.

Symmetrically with respect to the equatorial plane XX' of the device, in each lower edge of the top cap rubber 2 is a wire 21 the internal radius $R_2$ of which is smaller than the maximum external radius $R_1$ of the bearing ring 12 of the support 1. The wires 21, coated with rubber compound, are for anchoring a reinforcing belt or 23 composed of a single ply of metal cords made of steel and folded outward around said wires 21 to form turnups 230.

The wires are of the "braided" type, preferably without a central core, which gives good tensile strength while allowing sufficient ovalization for the top cap rubber 2 thus reinforced to be inserted with ease into the tire.

This belt is surmounted radially on the outside by a tread 24 of vulcanized rubber compound which has the specific feature of having low hysteresis losses in order to minimize the generation of heat. This tread 24 has circumferential grooves 240, two in the example described.

Figure 2:
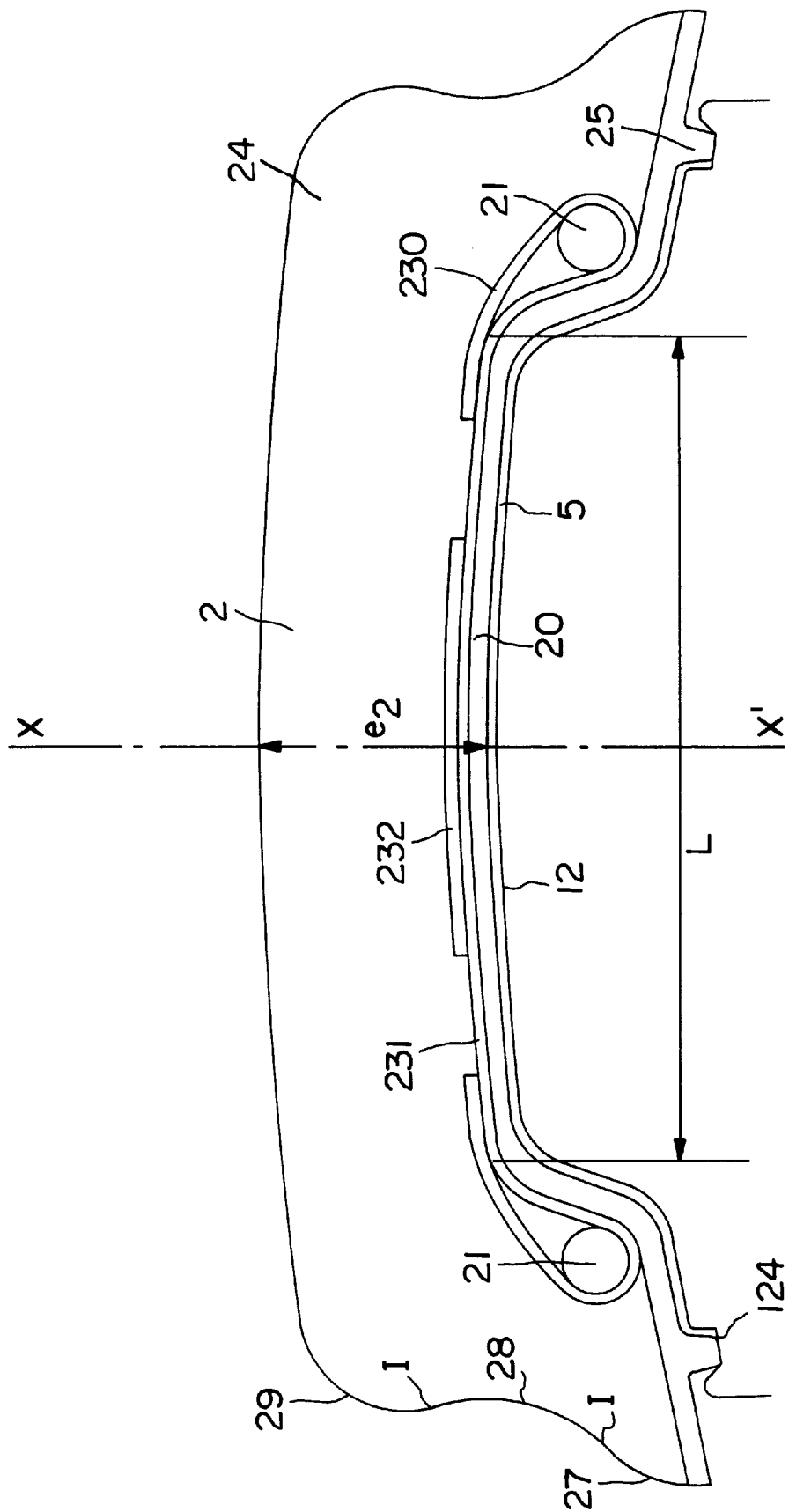

The alternative form of safety device S, shown in FIG. 2, differs from the example shown in FIG. 1 as follows:

a) the reinforcing wires 21 in cross section have a diameter which is half that of the wires shown in FIG. 1 and, on the other hand, are made of aromatic polyamide cords while still being of the "braided" type, b) the reinforcing belt 23 is formed of two plies: a first aromatic polyamide cord ply 231 wrapped in each edge of the top cap rubber 2 around a wire 21, said ply being surmounted in its central part by a ply 232 of circumferential reinforcing elements, which ply is obtained by winding a metal cord made of steel until the desired width of said ply 232 is obtained, said width being equal to 0.5 times the width L of the central part of the bearing ring 12, c) the lateral meridian profile of the top cap rubber 2 is not straight but is formed radially from the inside to the outside of an arc of a circle 27 of a first convex bulge, followed by the arc of a circle 28 of a concave recess, the radius of said arc of a circle 28 being more or less equal to the radius of curvature of said first bulge 27, said recess 28 itself being extended by the arc of a circle 29 of a second convex bulge which provides the connection with the radially upper face of the top cap rubber 2, said arc of a circle 29 having a radius of curvature which is such that the radial distance between the points of inflection I of the three arcs of a circle is more or less equal to at least 0.7 times the thickness $e_2$ of the top cap rubber 2. It is clear that the arcs of a circle defined hereinabove may be replaced by conic sections, whether these be parabolic, hyperbolic, elliptical, etc.

Figure 3:
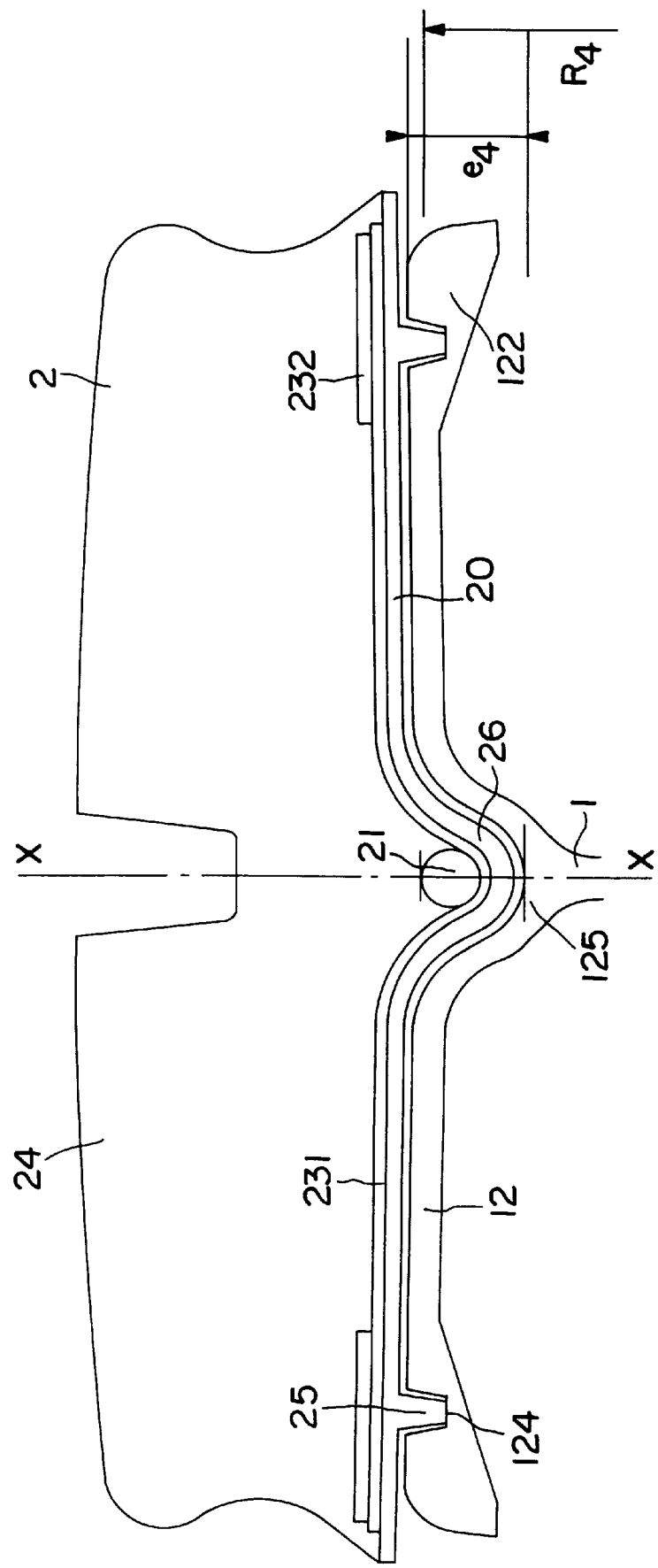

The lateral and not-straight meridian profile of each side of the top cap rubber 2 is also the profile of the top cap rubber 2 of the device shown in FIG. 3, this top cap rubber 2 radially surmounting a rigid metal support 1. The bearing ring 12 of the support 1 at its center has a well 125 falling axially between the two shoulders 122 of the bearing ring 12. This well 125 is intended to accommodate the central and circular rib 26 of the elastic top cap rubber 2, which rib is reinforced with a single wire 21 of the same type and same structure as the wires 21 used in the device depicted in FIG. 2. The well 125 has a depth measured in the equatorial plane XX' between its point closest to the axis of rotation and the imaginary straight line that joins those points of the shoulders 122 that are furthest from the axis of rotation such that the outside radius $R_4$ of the wire 21 reinforcing the rib is less than the radius of the imaginary straight line above, said depth $e_4$ being at least equal to 0.25 times the thickness $e_2$ of the top cap rubber 2. Said top cap rubber 2 in its radially lower part comprises a layer of vulcanized compound 20 identical to the layers in the top cap rubbers of FIGS. 1 and 2, a reinforcing belt 23 composed of a ply 231 of aromatic polyamide cords the width of which is more or less equal to the width of the bearing ring of the support and which passes radially under the reinforcing wire 21 and, situated one on each side of the equatorial plane XX', of two narrow plies 232 each formed of metal cords made of steel at an angle of between 0° and 5° with respect to the circumferential direction, the axial width of each of these plies 232 being equal to 0.25 times the axial width of the ply 231. A tread strip 24 with just one circumferential groove centered on the equatorial plane XX' completes the top cap rubber 2 thus making it possible, in conjunction with the presence of the two narrow plies, to obtain the most uniform possible distribution of mass. In accordance with the invention, a groove 124 intended to receive a circumferential rib 25, the groove and rib being as described earlier, is arranged on each shoulder 122 of the bearing ring 12.

I claim:

1. A device for supporting the tread of a tire, the device comprising a rigid bearing ring and an elastic top cap rubber made of vulcanizable rubber compound with a space for lubricant between the bearing ring and the top cap rubber allowing circumferential displacement of the top cap rubber and the bearing ring, the bearing ring comprising a central part having a radially external surface, two edges axially separated by the central part and a straight circumferential groove in the external surface of each edge, the radially external surface of the central part being further from the axis of rotation of the device than the radially external surfaces of the edges, the top cap rubber comprising a radially internal surface having edges adjacent the edges of the bearing ring, a circumferential rib depending from each of the edges of the radially internal surface of the top cap rubber for engaging a corresponding groove of the bearing ring, a reinforcing wire radially on the inside of each top cap edge and arranged axially facing the external surface of the ring edge, and a reinforcing belt to hold and circumferentially guide the top cap rubber on the external surface of the bearing ring, each rib being in contact with at least the bottom of the corresponding groove in the edge without being compressed against the bottom of the groove, and furthermore wherein the radially external shape of support bearing ring cooperates on the one hand with the reinforcing wires and on the other hand with the reinforcing belt of the elastic top cap rubber in order to hold and circumferentially guide the top cap rubber on the external face of the support, each rib on the radially internal face of the top cap rubber being situated axially further out than the projection on said face of the maximum axial width of the reinforcing wire.

2. A device as claimed in claim 1, in which the reinforcing belt includes a ply of aromatic polyamide cords folded around the reinforcing wires situated in the lateral edges, said ply being surmounted in its central part by a ply of aromatic polyamide cords which are mutually parallel and are at an angle of at most 10° with respect to the circumferential direction.

3. A device as set forth in claim 2, in which the cords of said surmounted ply are in the order of about 0°.

4. A device as set forth in claim 1, wherein the top cap rubber is reinforced with a wire made of aromatic polyamide cords.

5. The device as set forth in claim 1, wherein the lateral meridian profile of the top cap rubber is defined by a concave recess extended radially on the inside and radially on the outside by convex bulges.

* * * * *